O. W. OLSEN.
CLUTCH MECHANISM.
APPLICATION FILED APR. 16, 1917.

1,299,502.

Patented Apr. 8, 1919.
2 SHEETS—SHEET 1.

Inventor
Olaf William Olsen
By his Attorney

O. W. OLSEN.
CLUTCH MECHANISM.
APPLICATION FILED APR. 16, 1917.
1,299,502.
Patented Apr. 8, 1919.
2 SHEETS—SHEET 2.
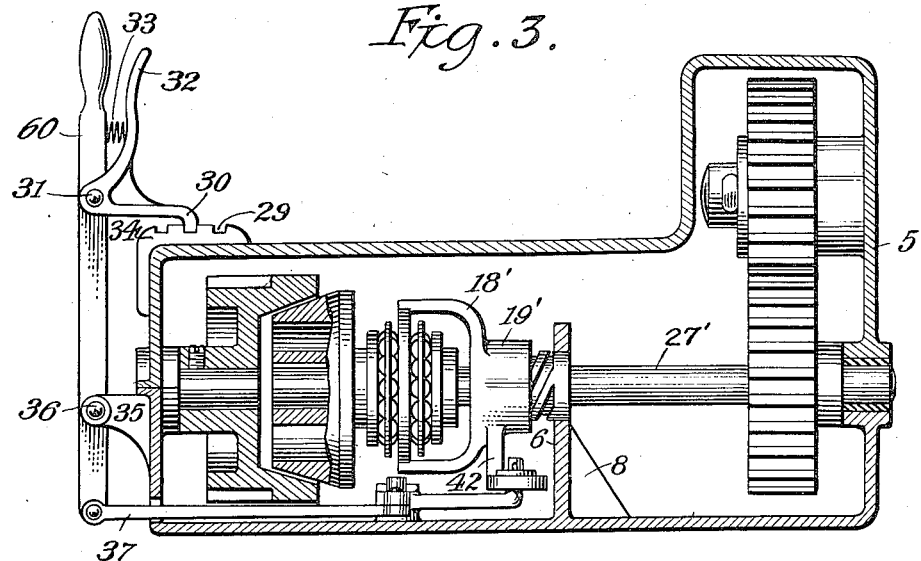
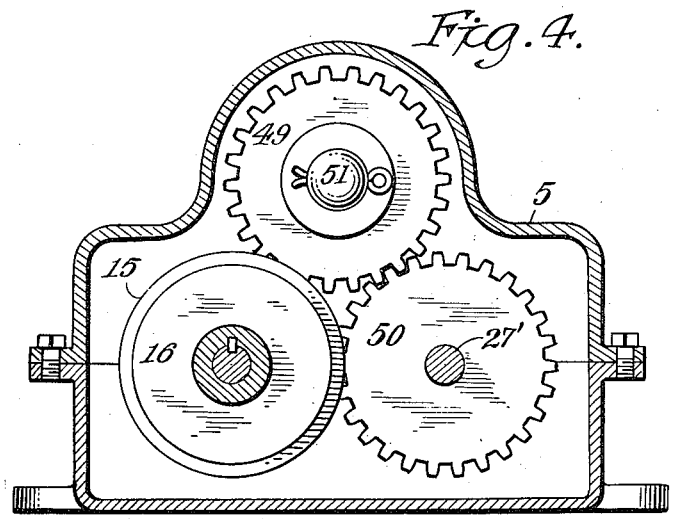
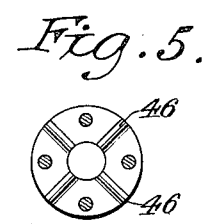

UNITED STATES PATENT OFFICE.

OLUF WILLIAM OLSEN, OF WOODHAVEN, NEW YORK.

CLUTCH MECHANISM.

1,299,502.  Specification of Letters Patent.  Patented Apr. 8, 1919.

Application filed April 16, 1917. Serial No. 162,257.

*To all whom it may concern:*

Be it known that I, OLUF WILLIAM OLSEN, a citizen of the United States, residing at Woodhaven, in the county of Queens and State of New York, have invented a certain new and useful Improvement in Clutch Mechanism, of which the following is a specification, reference being had to the accompanying drawings, which form a part of the same.

The object of my invention is to provide a clutch mechanism consisting of two or more clutch assemblies and means for neutralizing the operation of the said clutch assemblies with respect to the motive power, and means for engaging only one of said clutch assemblies at one time, the other being automatically held in neutral position. In the accompanying drawings I have shown my clutch mechanism as consisting of two clutch assemblies and the accompanying description describes the mechanism shown in the drawings.

In referring to the drawings:

Fig. 3 is a view taken along the line 3—3 of Fig. 1 looking in the direction of the arrow;

Fig. 4 is a cross section taken along the line 4—4 of Fig. 1 looking in the direction of the arrow; and Fig. 5 is a detail of the coupling connecting the gear mechanism to the engine, and also connecting the gear mechanism to the propeller or other mechanism to be controlled by the clutch mechanism.

Figure 1:
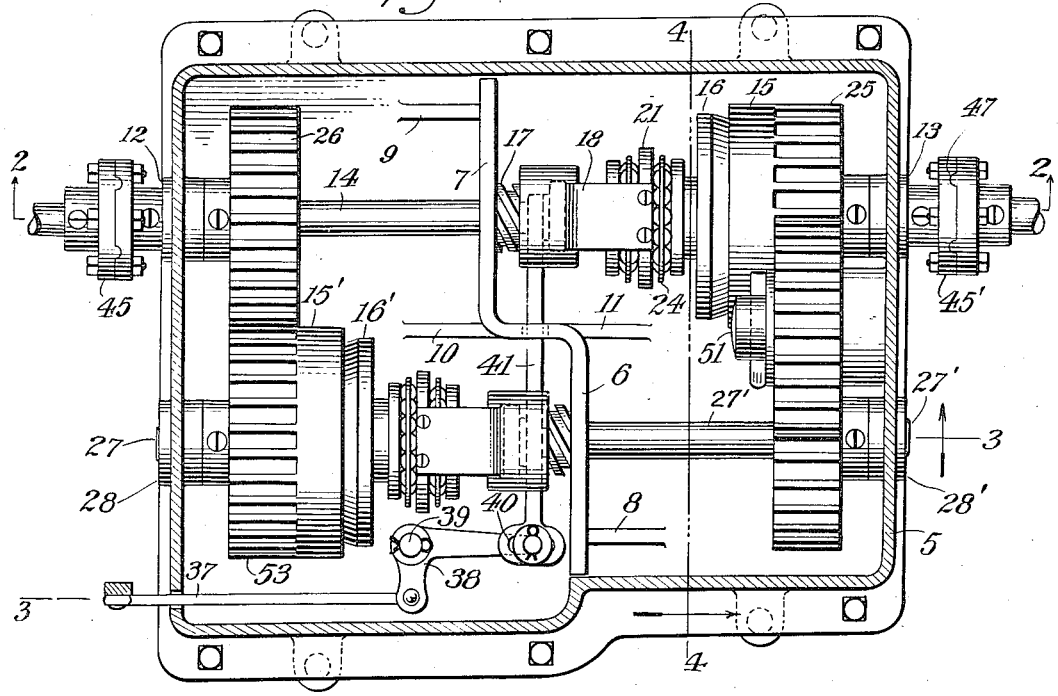
Figure 1 is a plan view of a gear casing and contents showing my twin clutch mechanism and accompanying parts.
Figure 2:
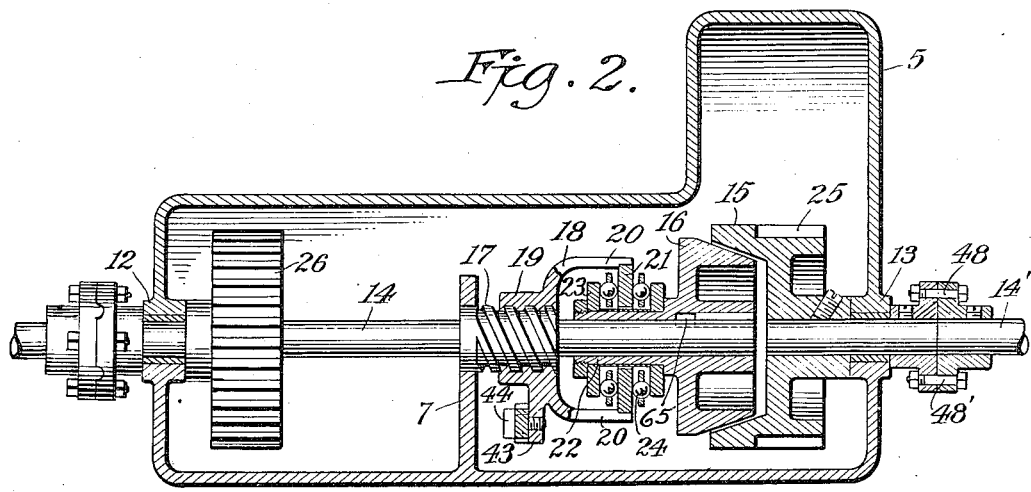
Fig. 2 is a cross section taken along the line 2—2 of Fig. 1.

Referring now in detail to the drawings, 5 represents a gear casing in which is mounted the standards 6 and 7 strengthened by the braces 8, 9, 10 and 11.

I have provided in the gear casing 5, journals 12 and 13, in which are mounted the shafts 14, 14', the shaft 14 being supported intermediate its ends by the standard 7 through which it extends. On shaft 14' is mounted the female member 15 of the clutch and on shaft 14 is mounted the male member 16 of the clutch. The clutch member 15 is keyed or otherwise secured to the said shaft 14', while the male member 16 is secured to the said shaft by the key 65 so as to adapt the said male member to revolve therewith, otherwise the said male member is slidable on said shaft.

I have also provided, integral with the support 7, a worm gear 17 on which is mounted to mesh with said gear a clutch shift 18 comprising a threaded sleeve portion 19 to coöperate with said worm gear 17, and the fork 20. This clutch shift 18 is also provided with a web 21 which surrounds the slidable sleeve 22 of the male clutch member 16. Mounted on the sleeve 22 are lugs 23 between which and the web 21 are mounted the ball bearing assemblies 24. On the female clutch member I have also provided a gear 25, and on the shaft 14 I have provided a gear wheel 26. Similar to the construction of the assembly just described I have provided another assembly mounted on the shafts 27, 27' mounted in the journals 28, 28', which in view of the description of the first mentioned assembly, it is not necessary to describe further.

I have provided a controlling lever 60 adapted to be held in position by means of the ratchet arrangement 29 and the pawl arrangement 30, the latter being pivotally mounted at 31 on the lever 60, and having a handle 32. This pawl arrangement is normally pressed by the action of the spring 33 onto or into the ratchet plate 34. I have provided a brace 35 on the gear casing 5 and supported pivotally by the pivot 36 is the lever 60. This lever is pivotally connected to the link 37 at one end, which link at the other end is pivotally connected to the angle link 38. This angle link as well as the link 37 is mounted on a stud which is integral with the gear casing 5. The other end of the angle link 38 is mounted in a slot 40 at one end of the link 41. The link 41 connects with the lug 42 and a similar lug 43 integral with the clutch shift assembly 18, said connection being pivotally made through the screw pivot 44.

I have also provided a novel means for connecting the shafts 14, 14' with the propeller shaft and the engine shaft respectively. This means consists of coupling elements shown at 45, 45' and consists of male and female members. The male member is provided with ribs 46 on its face while the female member is provided with grooves 47 which correspond with the ribs and coöperate therewith. The coupling elements when in position on their shafts are bolted together by means of the bolts 48, 48'.

Referring to Fig. 4 of the drawings in which the gear mechanism of Fig. 1, looking in the direction of the arrow on the line 4—4 is shown, 16 is the male member of the clutch while 15 is the female member. The gear 25 on the female member meshes with the gear 49, which latter meshes with the gear 50, the gear 49 being mounted on the stud 51 which is integrally connected with the gear casing 5. The female member of the clutch 15' is provided with cogs 53 which mesh with the gear wheel 26.

The operation of my device is as follows: In Fig. 3 the device is shown in neutral position with the pawl 30 seated in the middle groove of the ratchet 34. When in this position neither of the clutch mechanisms is in engagement, but the engine or motor which operates the torque shaft 14' is running idly with reference to the torque shaft 14 which operates the propeller mechanism or differential or other means intended to be operated thereby.

If it is desired to close the clutch so as to give the boat or vehicle a forward movement the lever is shifted until the pawl 30 occupies one of the outer notches in the ratchet plate 34. For purposes of illustration we will say that in forward position the pawl occupies the nearest seat of the ratchet to the lever 60. When the lever 60 has been moved to such position, the same has been rocked on the pivot 36, the link 37 has been moved forward and the angle link 38 has been moved anti-clockwise on its stud 39, and the link 41 pressed forward. This link 41 being connected to the clutch shifts 18, 18' through the lugs 42, 43 on the sleeves 19, 19', the male member 16 of the clutch is pressed into the female member 15 of the clutch. The clutch members 15 and 16 being closed motion is imparted to the torque shaft 14 and transmitted in the usual way to the traveling mechanism of the vehicle or boat operated thereby. The shifting of the lever 60 to the position described also effects a greater opening between the clutch members 15' and 16'. When in this position the gears 49 and 50, together with the clutch member 16' are running idly in one direction while the clutch member 15' is running idly in the opposite direction by reason of its connection with the gear wheel 26.

In order to reverse the operation of the torque shaft 14 the lever 60 is shifted so that the pawl 30 will be in the seat of the ratchet plate farthest away from the lever, the effect of this movement being to shift the link 41 with the clutch shift 18 in the opposite direction to that above described and thus close the clutch members 15' and 16'. and open the clutch members 15 and 16. The effect of this movement is that power is transmitted from the engine through the female member 15 of the clutch, the gear 49 to the gear 50 keyed onto the shaft 27', transmitting power to the female member 53 which in turn transmits power to the gear 26 keyed onto the torque shaft 14 and moving the same in the reverse direction.

In the above description and the accompanying drawings I have shown the preferable embodiment of my invention but I do not wish to be confined to the disclosure therein contained, but what I desire to cover by Letters Patent is set forth in the appended claims.

Claims:

1. In clutch mechanisms, a pair of clutch assemblies of like construction mounted parallel with each other but in different vertical planes from each other so that the clutch members of one assembly are diagonally situated from the clutch members of the other assembly, the clutch members of each of said clutch assemblies being adapted to connect with and separate from each other, a pair of shafts for each clutch assembly, one clutch member being rigidly connected to one shaft and the other clutch member being slidably connected to the other shaft but held against rotation on said shaft, and means for sliding said slidable clutch member so as to engage with and be separated from said other clutch member, and means for connecting said clutch assemblies with each other so as to simultaneously move one clutch member of one assembly toward the other clutch member of said assembly, and one clutch member of the other assembly away from the other clutch member of said assembly.

2. In clutch mechanisms, a pair of clutch assemblies of like construction mounted parallel with each other but in different vertical planes from each other so that the clutch members of one assembly are diagonally situated from the clutch members of the other assembly, the clutch members of each of said clutch assemblies being adapted to connect with and separate from each other, a pair of shafts for each clutch assembly one clutch member being rigidly connected to one shaft and the other clutch member being slidably connected to the other shaft but held against rotation on said shaft, and means for sliding said slidable clutch member consisting of a clutch shift and a worm sleeve in which one of said shafts is rotatably mounted, said clutch shift being adapted to be controlled in its travel by said worm, the worms on both of said clutch shifts being disposed in the same direction, and means connecting the clutch shifts on both assemblies so as to operate both clutch assemblies simultaneously in such manner so as to move one clutch member of one assembly toward the other clutch member of said assembly and one clutch member of the other assembly away from the other clutch member of said assembly.

3. In clutch mechanisms, a pair of clutch assemblies of like construction mounted parallel with each other but in different vertical planes from each other so that the clutch members of one assembly are diagonally situated from the clutch members of the other assembly, the clutch members of each of said clutch assemblies being adapted to connect with and separate from each other, a pair of shafts for each clutch assembly one clutch member being rigidly connected to one shaft and the other clutch member being slidably connected to the other shaft but held against rotation on said shaft, and means for sliding said slidable clutch member consisting of a clutch shift and a worm sleeve in which one of said shafts is rotatably mounted, said clutch shift being adapted to be controlled in its travel by said worm, and means connecting the clutch shifts of both assemblies so as to operate both clutch assemblies simultaneously in such manner so as to move one clutch member of one assembly toward the other clutch member of said assembly and one clutch member of the other assembly away from the other clutch member of said assembly.

OLUF WILLIAM OLSEN.

Witnesses:
JAMES N. CATLOW,
EVA GRACE TYCHRINGER.